United States Patent [19]
Stone et al.

[11] Patent Number: 5,768,488
[45] Date of Patent: Jun. 16, 1998

[54] ENHANCED PAGE PLACEMENT FOR MULTIPLE-UP PRESENTATION

[75] Inventors: David Earl Stone, Longmont; Reinhard Heinrich Hohensee, Boulder; James Warden Marlin, Longmont, all of Colo.

[73] Assignee: International Business Machines Corporation, Armonk, N.Y.

[21] Appl. No.: 393,758

[22] Filed: Feb. 24, 1995

[51] Int. Cl.[6] .............. G06F 15/00; H04N 1/387; H04N 1/393
[52] U.S. Cl. .............. 395/117; 395/102; 395/100; 395/101; 358/448; 358/450; 358/451
[58] Field of Search .................... 395/100, 101, 395/102, 117, 112, 114, 111; 358/450, 451, 296, 448, 444, 443

[56] References Cited

U.S. PATENT DOCUMENTS

| | | | |
|---|---|---|---|
| 4,636,872 | 1/1987 | Prichard | 358/296 |
| 4,928,252 | 5/1990 | Gabbe et al. | 364/519 |
| 5,146,343 | 9/1992 | Fujii . | |
| 5,191,429 | 3/1993 | Rourke . | |
| 5,231,516 | 7/1993 | Kamon et al. . | |
| 5,257,035 | 10/1993 | Funahashi et al. | 346/1.1 |
| 5,282,050 | 1/1994 | Ishizuka et al. | 358/400 |
| 5,289,569 | 2/1994 | Taniguchi . | |
| 5,301,036 | 4/1994 | Barrett et al. | 358/448 |
| 5,398,289 | 3/1995 | Rourke et al. | 382/1 |
| 5,461,469 | 10/1995 | Farrell et al. | 355/321 |
| 5,495,561 | 2/1996 | Holt | 395/114 |

*Primary Examiner*—Edward L. Coles, Sr.
*Assistant Examiner*—Mark Wallerson
*Attorney, Agent, or Firm*—Robert B. Martin

[57] ABSTRACT

A page placement process for advanced function print systems that is integrated in the datastream presentation architectures utilized for the storage, retrieval, and printing of documents over a wide range of applications and system environments. The process enables user defined placement of pages in an N-up environment in terms of sheet, sheet side, partition, offset and orientation.

3 Claims, 9 Drawing Sheets

ENHANCED PAGE PLACEMENT FOR MULTIPLE-UP PRESENTATION

BACKGROUND OF THE INVENTION

1. Field of the Invention

This invention pertains to the field of information processing system organization, and more specifically to page placement processes that are integrated in the data stream presentation architectures utilized for the storage, retrieval, and printing of documents over a wide range of applications and system environments.

2. Description of the Prior Art

Presentation architectures provide the means for processing documents on many different platforms in a manner independent of the methods used to capture or create them or the systems on which they may be archived, viewed, or printed. One such architecture is Mixed Object Document Content Architecture (MO:DCA) which provides for the storage of documents on print spools or archive files and the interchange of those documents between applications and or computers. The documents themselves, the source data, can be generated by a number of different document generation applications. The overall architecture specifications are set forth in IBM reference "*Data Stream and Object Architectures MIXED OBJECT DOCUMENT CONTENT ARCHITECTURE REFERENCE*" SC31-6802-02 June, 1993.

Printing of these documents involves the transformation of the MO:DCA formatted source data to another presentation architecture known as Intelligent Printer Data Stream (IPDS) Architecture, which is capable not only of containing the data, and resources present in the MO:DCA architecture, but also of managing document presentment to a specific printer device and controlling the output of that device. The transfer of information, as accomplished using the IPDS architecture, is characterized by a datastream where the stream contains data, resources and commands in one stream. The overall architecture specifications are set forth in U.S. Pat. No. 4,651,278 and in IBM reference "Data Stream and Object Architectures INTELLIGENT PRINTER DATA STREAM REFERENCE" S544-3417-04, August 1993; herein incorporated by reference.

The printers capable of interfacing with the IPDS data stream are capable of placing a dot or picture element at any point on a sheet. Software support for these all-points-addressable (APA) printers has lagged far behind the development of the print engines themselves. Neither the MO:DCA or IPDS datastreams support full-featured multiple page placement on a sheet side.

The placement of multiple pages on a sheet side is known as N-up where N is an integer number of pages per side greater than unity. There are some printers which do support N-up. U.S. Pat. No. 4,928,252, for example, discloses an N-up system in which pages are placed in page order in a portrait or landscape oriented grid system chosen to minimize overall page scaling. This bulk approach to document storage emphasizes conservation of paper at the possible expense of legibility and format control.

While the art has generally developed in a satisfactory manner to begin the exploitation of N-up technology, as above exemplified, a need remains for a printer system wherein a user may individually tailor page placement in an N-up environment to best exploit the characteristics of the medium on which the document is being printed.

SUMMARY OF THE INVENTION

This invention is applicable to printer systems whose processes are controlled by a single datastream in which are nested data objects, resource objects, and device control objects. The inventive process permits those printer systems to support full featured N-up printing. The invention will be described while making reference to the use of what is known as MO:DCA and IPDS datastreams. However, the spirit and scope of the invention is not to be limited thereto.

The prior IPDS and MO:DCA architectures lack support of a fully featured explicit positioning N-up printing environment. The current invention provides a process which can be seamlessly integrated into prior IPDS and MO:DCA architectures and the accompanying hardware systems for supporting a fully featured N-up printing environment.

The present invention accomplishes this function by addition of structures to MO:DCA and IPDS resource objects which support full featured N-up printing. The MO:DCA resource objects and data objects are linked and processed by the print system manager which has been altered as part of this invention to accommodate the new structures. The enhanced print system manager seamlessly transforms the enhanced MO:DCA resource objects into enhanced IPDS structures. Additionally, the invention involves modifications to the logical sheet builder to support the enhanced functionality of the resource objects.

The great advantage of the invention is that it provides enriched support for N-up printing, by allowing page placement to be defined in terms of sheet side, sheet partition, offset within partition, and orientation within partition without requiring change to the MO:DCA data objects created by the host application. In particular, the same N pages may be presented in any position in any combination on the front and back side of the sheet, in as many configurations as desired, without requiring changes to the data objects. These and other features and advantages of the invention will be apparent to those of skill in the art upon reference to the following detailed description, which description makes reference to the drawings.

DETAILED DESCRIPTION OF THE PREFERRED EMBODIMENTS

The following terminology will be used herein to describe preferred embodiments of the invention.

The term Data objects refers to those objects within a datastream which contain print data. Data objects are broken down into Text objects with appropriate font specifications, Image objects with appropriate compression and color specifications, and Graphics objects with appropriate vector specifications.

The term Logical page refers to a two dimensional electronically mapped collection of Data objects which in total constitute the total contents of a page of data.

The term Resource objects refers to those objects within a datastream which contain presentation instructions. These instructions are expressed in the syntax of structured fields, where each field begins with an identifier and is followed by byte-segments of predetermined length specifying one or more parameters of the given structured field. A Form Map Object, for example, is a resource object that specifies the manner of presentment of document pages on a physical medium, in terms of offset from the media origin and side. The term Device Control objects refers to those objects within the datastream which contain device control instructions. Device control objects are a collection of commands that initialize, manage, and communicate with the printer.

The term Archive file and Print Spool refer to that system component which accepts and stores page description and page format data by document and by job for subsequent retrieval and presentation.

The term Print System Manager refers to that system component which transforms data and resource objects stored on the print spool into a format suitable for a specific printer and which, in addition, manages and controls the printer. The print system manager is then the system component which transforms a MO:DCA datastream to an IPDS datastream.

The term Logical Sheet Builder refers to that hardware device which buffers logical page data received from the print system manager and which then places those buffered logical pages in bit mapped format in the appropriate position on a logical sheet, which sheet is then downloaded to the printer to form an actual sheet.

This invention is applicable to printer systems whose processes are controlled by a single datastream in which are enveloped; data objects, resource objects, and device control objects. The inventive process permits those printer systems to support full featured N-up printing. The invention will be described while making reference to the use of what is known as MO:DCA and IPDS datastreams.

Figure 1:
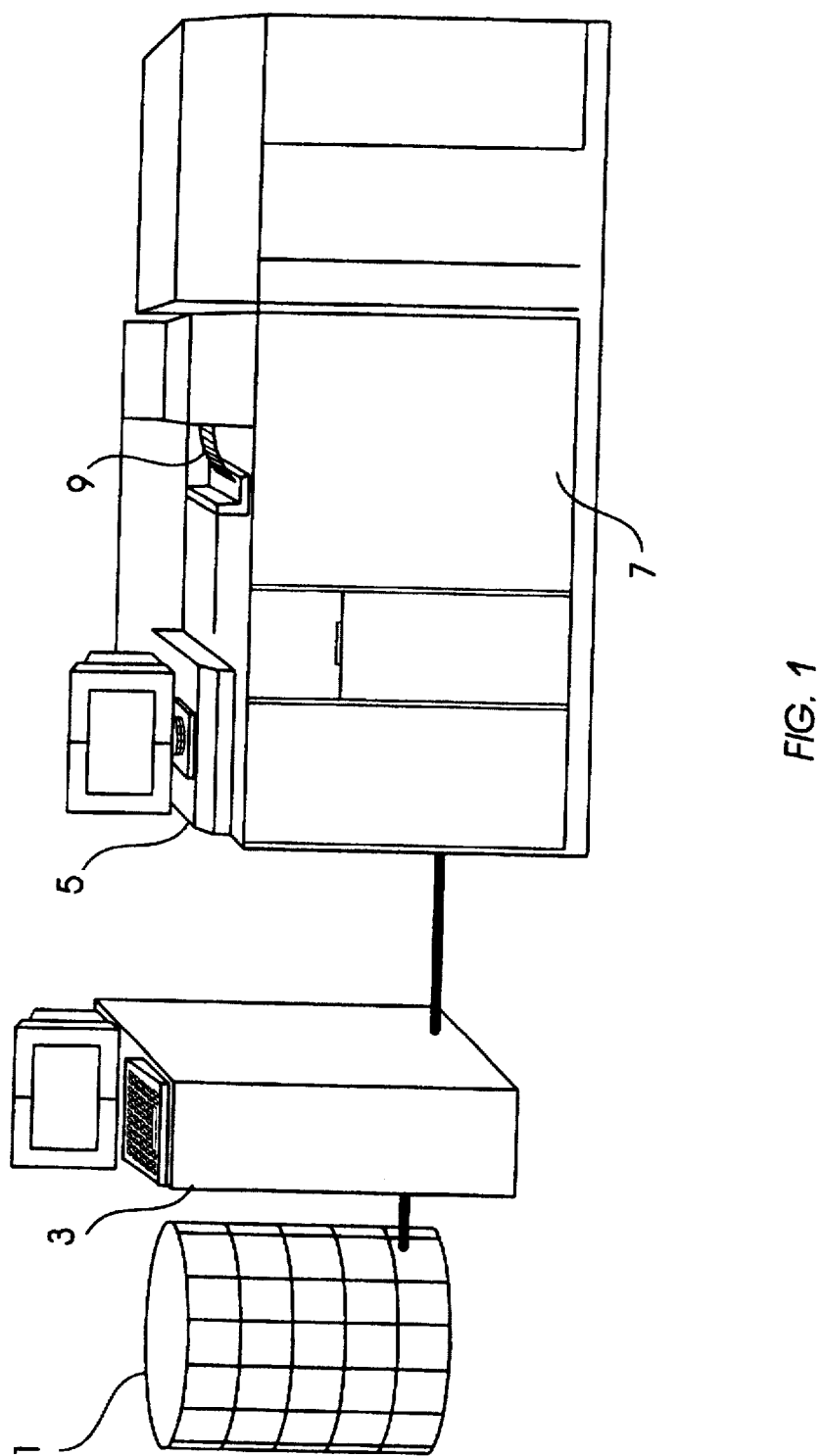
FIG. 1 is a diagram of print system hardware components.

FIG. 1 is diagram of print system components in accordance with the invention, the system comprising an archive file or print spool 1 for the storage of a MO:DCA datastream. The data is accessed by the print system manager 3. The print system manager transforms MO:DCA data and resource objects into IPDS data, resource, and control objects and sends the resultant IPDS datastream to the printer controller 5. The printer controller, in turn, outputs bit mapped sheet images to the print system engine 7. The print system engine produces printed paper output 9.

Figure 2:
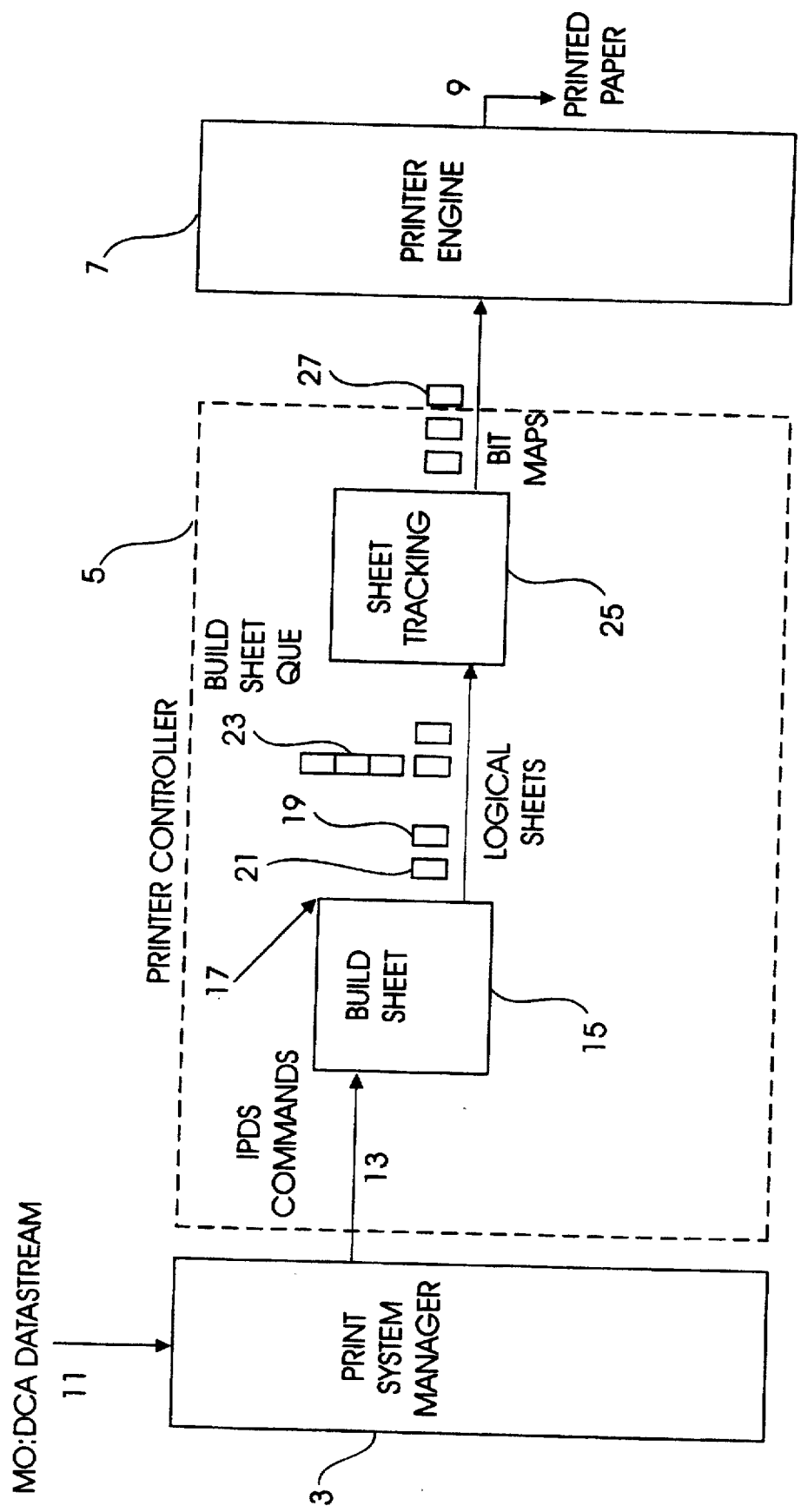
FIG. 2 is a diagram of a printer system showing the details of the printer controller.

In FIG. 2, the details of the printer controller 5 are shown. The MO:DCA datastream 11 consisting of data and resource objects is summoned by the print system manager 3. The print system manager, in turn, transforms the MO:DCA datastream into an IPDS datastream 13 which is sent to the build sheet module 15 of the printer controller 5. The build sheet module analyzes the IPDS data and resource objects and places the appropriate number of pages in the appropriate position on a logical sheet. A logical sheet is an electronic image of the sheet before it is printed. The receipt of a page object is marked by an up increment of the received page counter 17. The output of the build sheet module is in the form of logical sheets 19 and 21. These sheets are then placed in a build sheet queue 23. The build sheet queue is processed by the sheet tracking module 25 which operates to form a bit map stream 27. The bit map stream is processed by the print engine 7 and the bit mapped images are printed on paper 9.

Figure 3:
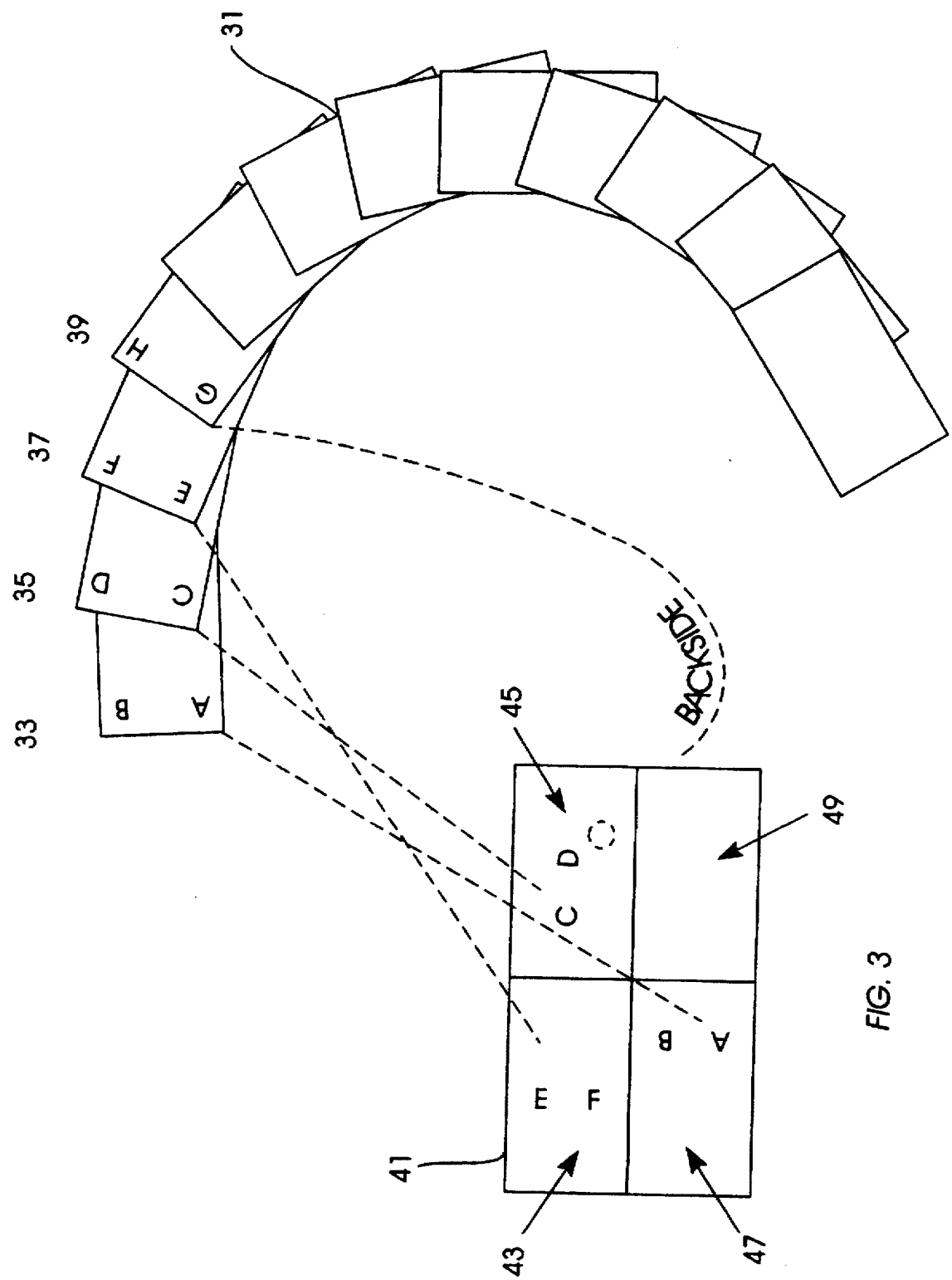
FIG. 3 depicts a logical page queue and the placement of individual pages in that queue on a logical sheet.

FIG. 3 depicts a logical page queue 31 and the placement of individual logical pages 33,35,37,39 in that queue on a logical sheet 41. It should be noted that specific logical pages can be selected from their known location in print spool or archive file 1 and grouped in accordance with a user's predetermined print sequence and arrangement of the selected logical pages on the target media in predetermined sheet order. The process of the current invention allows logical pages to be placed in out of queue order on either front or back of logical sheet 41, in any of eight partitions four on back and four 43, 45, 47, 49 on front on that logical sheet, in any of four orientations, and in any offset from the partition origin. Page 33 is the first in the queue and has been placed in out of queue order in the third partition 47 on the front of logical sheet 41 and is reoriented 270 degrees. Page 35 has been placed on the front of logical sheet 41 in the second partition 45 and has been oriented 0 degrees during that placement. Page 39 is placed on the back of logical sheet using default page placement in one of the four partitions on the back of the sheet. Because default placement was used, that portion of page 39 that overlapped another partition was trimmed. Page 37 has been placed on the front of logical sheet 41 in the first partition 43 and has been reoriented 90 degrees during that placement. All four pages 33, 35, 37, 39 have been placed in their partitions on the logical sheet 41 at positions offset from exact alignment with the partition borders.

This explicit positioning capability discussed above, originates in a page tagging method derived from alterations to a MO:DCA resource object known as the Page Positioning command (PGP). The PGP structured field specifies the position and orientation of the page's presentation space on the presentation medium or sheet. Architecturally, a PGP structured field will in the N-up mode contain repeating groups where each member of the repeating group defines the positioning of a specific page. The PGP structured field will itself be part of a larger enveloping structure called a medium map. This larger structure defines how the pages positioned by the PGP will be treated at the media level in terms of medium size, orientation, copies, simplex or duplex, overlays, source and destination. The medium map is, in turn, enveloped by a larger structure called a form map which controls document presentation. One of the structured fields within the media map is known as Medium Modification Control (MMC).

The interaction of the PGP page level command with the MMC medium level command is part of this invention. If N-up is not specified by the MMC, then default placement of either one page per sheet in the simplex mode or one page on either sheet side in the duplex mode is called for. If partitioning is specified by the MMC, the medium presentation spaces on the front and back sides of a sheet are divided into N partitions, and the PGP structured field specifies the partition into which each page is mapped and with respect to which the page presentation space is positioned and oriented. The N-up page-to-partition mapping can be specified in two mutually exclusive ways, as follows:

Default N-up placement: Pages are processed in the order in which they appear in the datastream and are placed into consecutively-numbered partitions. If N-up equals four; the first page is placed into partition 1, the second page is placed into partition 2, the third page is placed into partition 3, and the fourth page is placed into partition 4. If N-up simplex, the PGP contains one repeating group. If N-up Duplex the PGP contains two repeating groups.

Explicit N-up page placement: Pages are processed in the order in which they appear in the data stream and are placed into the partition that is explicitly specified by the repeating group for the page. Multiple pages may be placed into the same partition. If N-up simplex is specified, the PGP structured field must contain N repeating groups. If N-up duplex is specified, the PGP must contain 2N repeating groups.

The PGP repeating groups are preferably broken down as follows:

Byte 0: Specifies the length of the repeating group as 10 or 12 bytes.

Byte 1–6: The Xm and Ym coordinate of the page presentation space origin. If N-up partitioning is specified by the MMC structured field, the offset is measured from the partition origin. A reasonable offset range for Xm and Ym is 0-5461 when the medium coordinate system units of measure are 240 units per inch, and 0-32767 when they are 1440 units per inch.

Byte 7–8: The page presentation space X axis rotation, 0, 90, 180, 270, from the X axis of the medium presentation space.

Byte 9: Sheet side and explicit page placement partition selection up to N-up equals four. Further partitioning may be desirable.

| | |
|---|---|
| X'00' | Page on front side if no N-up, default page placement on front side if N-up |
| X'01' | Page on back side if no N-up, default page placement on back side if N-up |
| X'10' | Explicit placement; partition 1, front side |
| X'11' | Explicit placement; partition 1, back |
| X'20' | Explicit placement; partition 2, front |
| X'21' | Explicit placement; partition 2, back |
| X'30' | Explicit placement; partition 3, front |
| X'31' | Explicit placement; partition 3, back |
| X'40' | Explicit placement; partition 4, front |
| X'41' | Explicit placement; partition 4, back |

Figure 4:
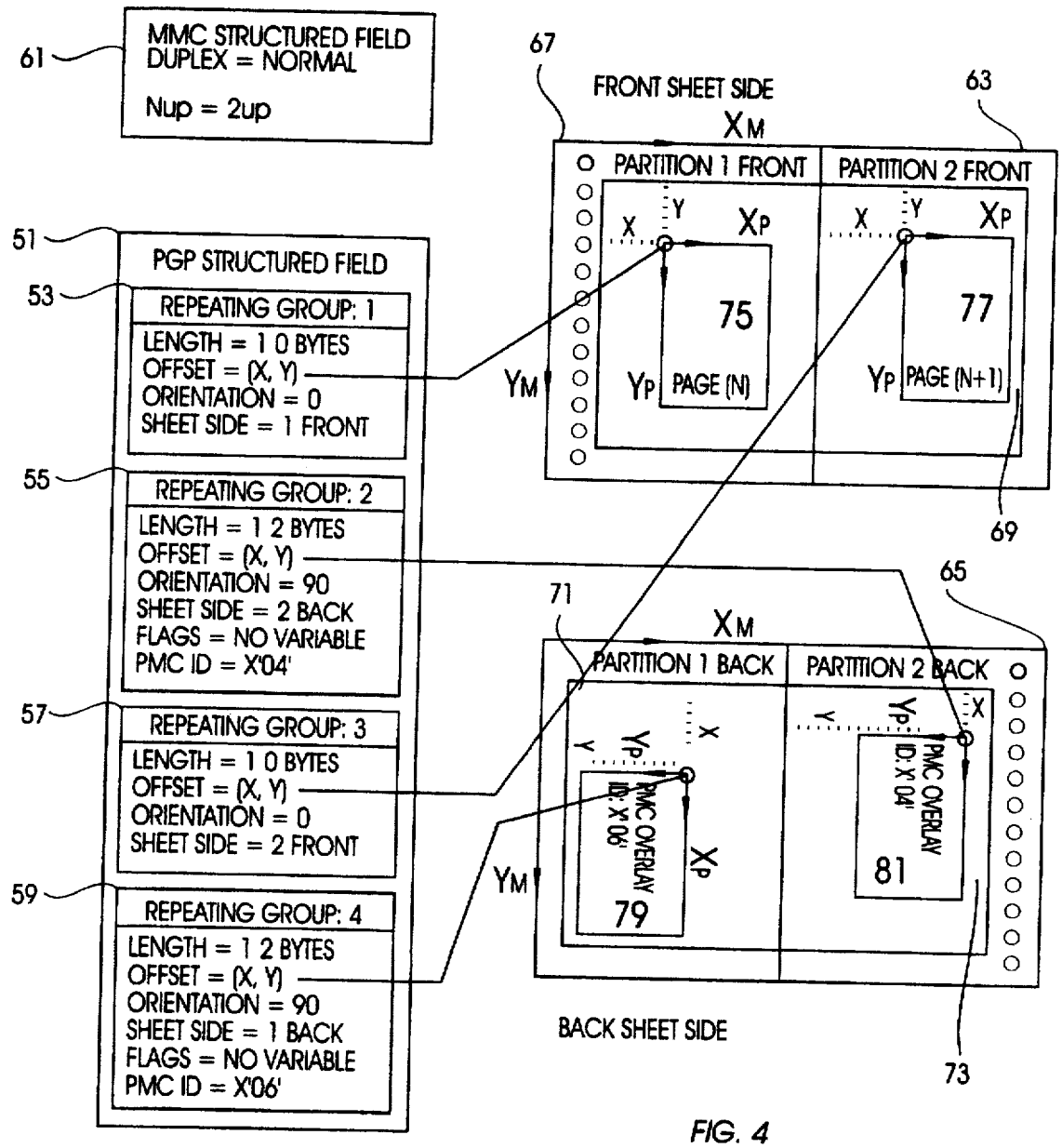
FIG. 4 shows a portion of a MO:DCA datastream and the resultant page layout on a sheet.

Byte 10: Additional presentation controls for the medium.
  Bit 0: Print or do not print variable page data.
  Bit 1: Print or do not print overlays
  Bit 2: Offset measured from page or partition origin
Byte 11: Print Overlay Identifier FIG. 4 shows a PGP structured field 51 with repeating groups 53, 55, 57, 59 where each repeating group specifies the placement of pages 75, 77, 79, 81 on a sheet front side 63 or backside 65. The PGP structured field 51 is preceded by a medium map MMC structured field which specifies the mode, in this case duplex, and the N-up environment for the repeating group 51.

The first repeating group 53 of the PGP structured field 51 specifies a field length of ten bytes. This means there will be no page blanking or overlays provided. The PGP structured field further specifies an offset x,y from the partition origin, an orientation with respect to the media of zero degrees, and a placement on the front 63 of the sheet in partition 67.

The second repeating group 55 of the PGP structured field 51 specifies a field length of twelve bytes. This means there can be page blanking or overlays provided. In fact no variable page is specified and overlay ID X' 04' is specified. The PGP structured field further specifies an offset x,y from the partition origin, an orientation with respect to the media of ninety degrees, and a placement on the back 65 of the sheet in partition 73.

The third repeating group 57 of the PGP structured field 51 specifies a field length of ten bytes. This means there will be no page blanking or overlays provided. The PGP structured field further specifies an offset x,y from the partition origin, an orientation with respect to the media of zero degrees, and a placement on the front 63 of the sheet in partition 69.

The fourth repeating group 59 of the PGP structured field 51 specifies a field length of twelve bytes. This means there can be page blanking or overlays provided. In fact, no variable page is specified and overlay ID X' 06' is specified. The PGP structured field further specifies an offset x,y from the partition origin, an orientation with respect to the media of ninety degrees, and a placement on the back 65 of the sheet in partition 71.

The modifications to the MO:DCA resource object, specifically the PGP structured field, constitute the first step in the process of tagging pages for explicit page placement in a presentation medium. The next step in the tagging process involves modifications to a resource object in the IPDS datastream and, more specifically, to the Logical Page Position (LPP) structured field. Each PGP repeating group is transformed into one LPP structured field. The LPP structured field specifies the position of the logical page origin of a page with respect to either the origin of the medium presentation space or the origin of a particular partition.

The LPP structured field is ten bytes long and is broken down as follows:

Byte 0: Reserved

Byte 1–3, 5–7: The Xm, Ym coordinate of the page presentation space origin. If N-up partitioning is specified by the MMC structured field, the offset is measured from the partition origin. A reasonable offset range for Xm and Ym is 0-5461 when the medium coordinate system units of measure are 240 units per inch, and 0-32767 when they are 1440 units per inch.

Byte 4: Sheet side and explicit page placement partition selection up to N-up equals four. Further partitioning may be desirable.

| | |
|---|---|
| X'00' | Default placement |
| X'10' | Explicit placement; partition 1, front |
| X'11' | Explicit placement; partition 1, back |
| X'20' | Explicit placement; partition 2, front |
| X'21' | Explicit placement; partition 2, back |
| X'30' | Explicit placement; partition 3, front |
| X'31' | Explicit placement; partition 3, back |
| X'40' | Explicit placement; partition 4, front |
| X'41' | Explicit placement; partition 4, back |

Byte 8–9: The page presentation space X axis rotation, 0, 90, 180, 270, from the X axis of the medium presentation space.

Figure 5:
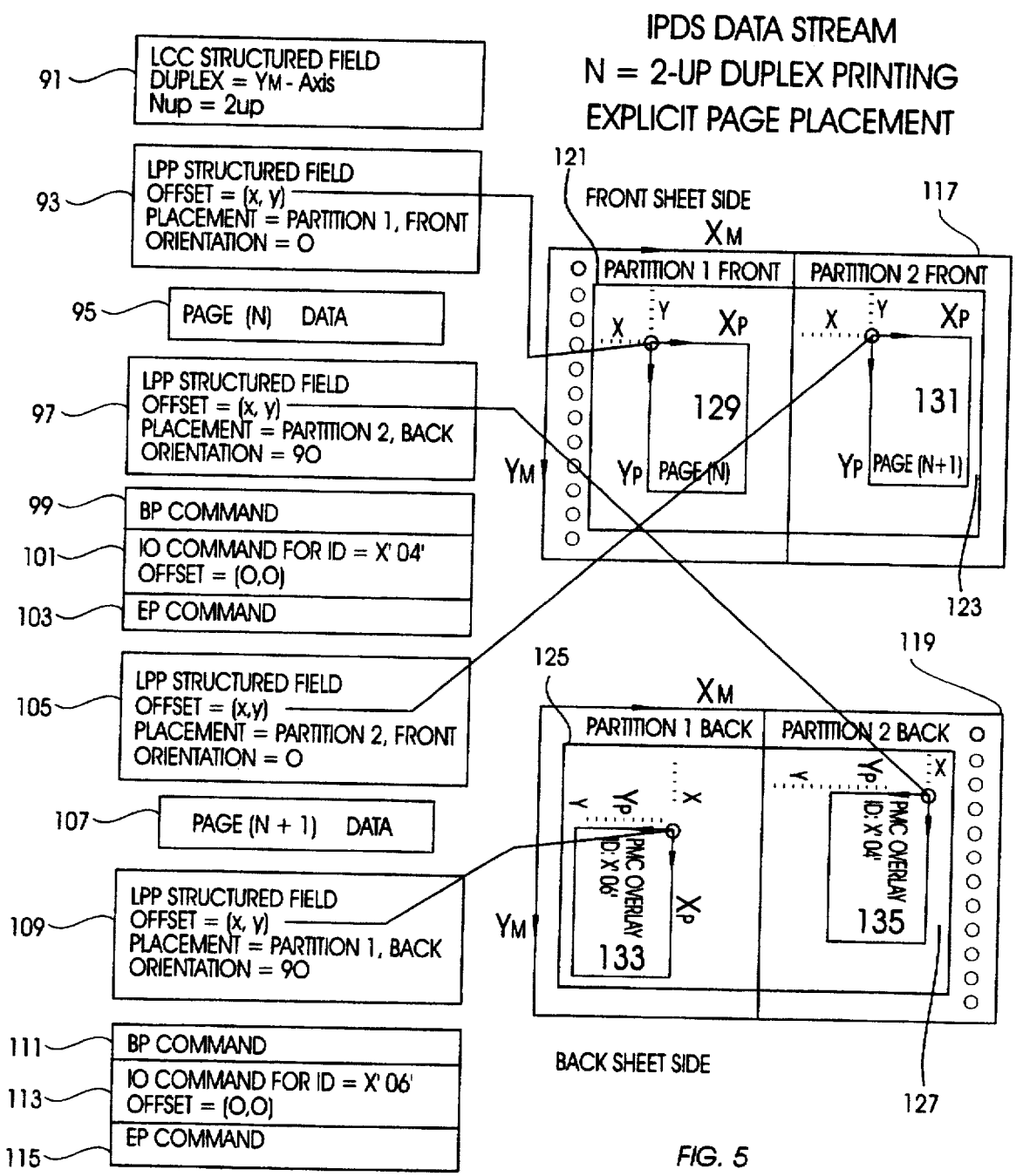
FIG. 5 shows a portion of an IPDS datastream and the resultant page layout on a sheet.

In practice, the relationship of the LPP structured field to an IPDS datastream is shown in FIG. 5. A Load Copy Control structured field 91 controls the production of printed output from subsequently received input data. In this case, duplex mode and N-up equals two is specified.

The first LPP structured field 93 specifies an offset x,y from the partition origin, an orientation with respect to the media of zero degrees, and a placement on the front 117 of the sheet in partition 121. The following object in the IPDS datastream is a data object consisting at a minimum of a begin page command followed by data objects for page N followed by an end page command. This page data 95 is placed in a position dictated by the last received LPP command which, in this case, is LPP 93.

The second LPP structured field 97 specifies an offset x,y from the partition origin, an orientation with respect to the media of ninety degrees, and a placement on the back of the sheet in partition 127. The following objects in the IPDS datastream are a begin page command (BP) 99 followed by an include overlay command with an overlay ID of X'04' 101 and an end page command (EP) 103. This overlay data 101 is placed in a position dictated by the overlay offset and the last received LPP command 97.

The third LPP structured field 105 specifies an offset x,y from the partition origin, an orientation with respect to the media of zero degrees, and a placement on the front 117 of the sheet in partition 123. The following object in the IPDS datastream is a data object consisting at a minimum of a begin page command followed by data objects for page N+1 followed by an end page command. This page data 107 is placed in a position dictated by the last received LPP command which in this case is LPP 105.

The fourth LPP structured field 109 specifies an offset x,y from the partition origin, an orientation with respect to the media of ninety degrees, and a placement on the back 119 of the sheet in partition 125. The following objects in the IPDS datastream are a begin page command (BP) 111 followed by an include overlay command with an overlay ID of X'06' 113 and an end page command (EP) 115. This overlay data 113 is placed in a position dictated by the overlay offset and the last received LPP command 109.

Figure 6:
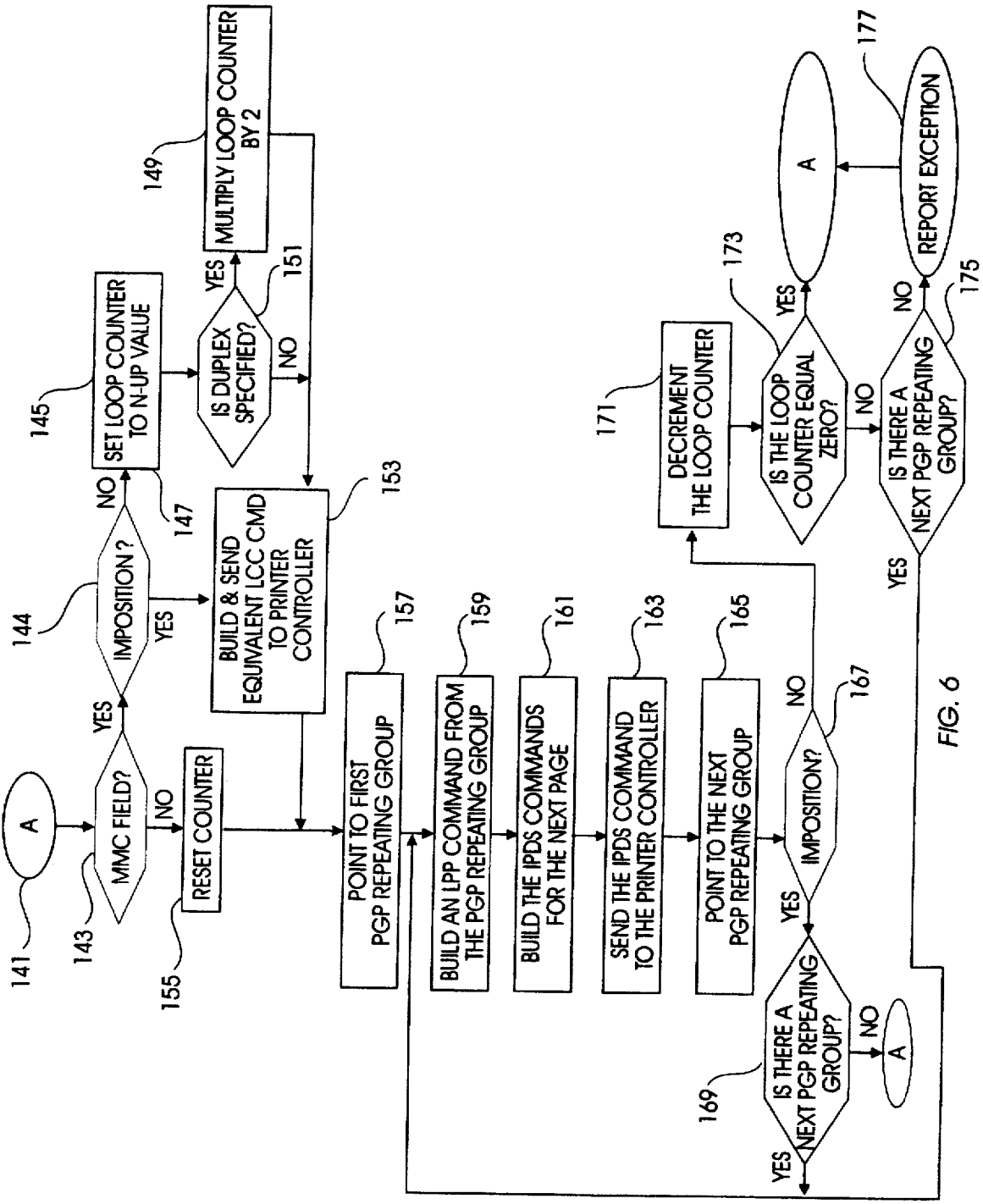
FIG. 6 depicts a process transform for MO:DCA PGP to IPDS LPP in the print system manager.

Given the above MO:DCA and IPDS datastream, the print system manager as detailed in FIG. 6 transforms PGP repeating groups in the MO:DCA datastream into appropriate LPP structured fields within the IPDS datastream.

The MO:DCA datastream 141 is processed for (Medium Modification Control) MMC structured fields in decision operation 143. If such a field is found, it may specify imposition placement or it may specify N-up placement or it may specify neither. The imposition value specifies the number of pages per sheet, the N-up value specifies the number of partitions per sheet side, and specifying neither is equivalent to specifying N-up equals one. In the former case, of imposition page placement, the number of pages per sheet will be equivalent to the number of repeating groups in the PGP structured field. In the latter two cases the number of pages per sheet will, in the simplex mode, be equal to the N-up value and in duplex mode equal to twice the N-up value.

In the event imposition mode is detected in decision 144, then control proceeds directly to process 153 in which an LCC command equivalent to the MMC command is built and sent to the printer via the IPDS datastream. Since imposition contemplates the placement of pages on a sheet without use of or reference to partitions, imposition logical page offsets are determined with reference to page origin and not partition origin.

If imposition is not detected in decision 144 then, in process 145, a loop counter is set to the N-up value specified, by the MMC field or to a value of one if no N-up value is specified. Subsequently, decision operation 151 processes the mode specifier in the MMC structured field. If the mode specifier is duplex, then step 149 doubles the loop counter value, and operation 153 builds and sends equivalent LCC command to the printer controller. If the MMC field mode specifier is simplex, the process branches from operation 151 to step 153, which process builds and sends an equivalent LCC IPDS command to the printer controller.

In the event an MMC field is not detected at decision operation 143, step 155 resets the loop counter to the value set by the last received MMC field. Whether or not an MMC structured field is detected, process step 157 points to the first PGP repeating group in the MO:DCA datastream. Logical operation 159 transforms the PGP repeating group to its LPP IPDS equivalent. Subsequent to processing the MO:DCA PGP structured field, step 161 processes the data objects for the corresponding page. If no variable data is specified, a blank page is built. If an overlay is specified in the PGP repeating group, an IPDS include overlay command is built. Step 163 sends the IPDS command and data equivalents to the printer controller. In process 165, the next PGP repeating group entry in the MO:DCA datastream is sought.

If imposition mode is detected by decision process 167, then control is passed to decision process 169 to determine if there is another repeating group in the PGP structured field. If there is not a repeating group, control returns to entry process 141, indicating that no more pages will be associated with the current sheet definition. If there is another repeating group, then control returns to process 159. Alternately, if not in the imposition mode, as detected by decision process 167, then control is passed to process step 171 to decrement the loop counter. Subsequently control passes to decision step 173 to determine if the loop counter has a null value. If null, then the last page associated with a given sheet has been transformed and control returns to data entry process 141. Alternately, if the loop counter has a non-null value as determined in decision 173, then control passes to decision 175 to determine if there is another PGP repeating group. If there is not, then an exception is generated in logical process 177, since the loop counter has a non-zero value and, yet, there are no more repeating groups. Subsequently, control returns to entry process 141 with renewed analysis of the next sheet worth of data from the MO:DCA datastream. Alternately, if there is another repeating group as determined in logical process 175, then control returns to process 159 for transformation of the next repeating group, found in process 165, to a corresponding LPP command.

The building of sheets from the IPDS datastream is shown in FIG. 7 A–C. The process flow in the Build Sheet unit is detailed from the input of an IPDS datastream to the output of logical sheets to the sheet tracking unit.

Figure 7A:
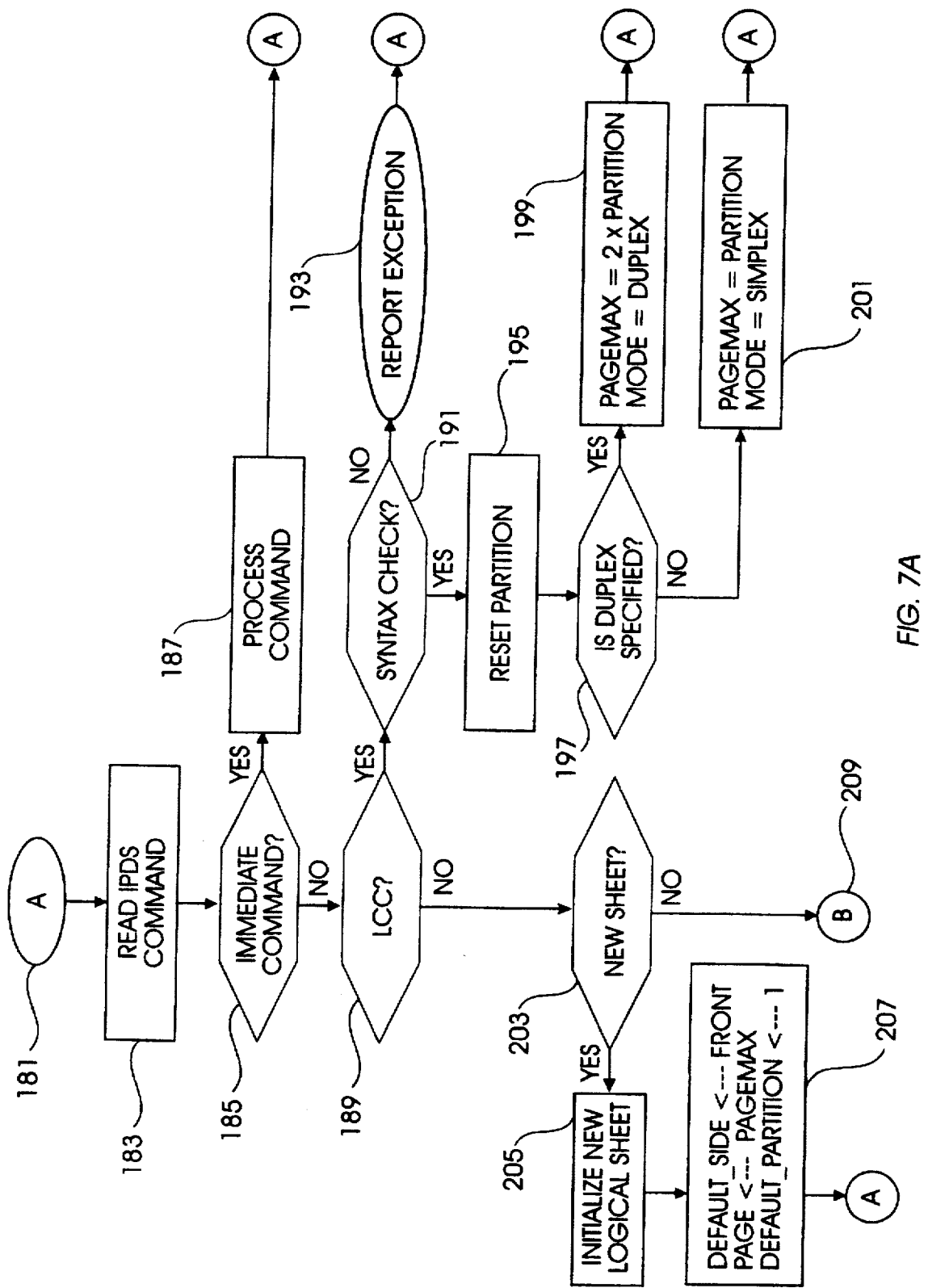
FIG. 7 A–C shows the processing of the IPDS datastream by build sheet function of the printer controller.

The IPDS datastream from the Print System Manager is received by the Build Sheet unit at datastream entry 181 in FIG. 7A. In process step 183, the IPDS command stream is processed. In decision step 185, the next command in the datastream is processed to see if it is an immediate command. If the command is immediate, then process 187 initiates the appropriate response to that command, for example, clearing sheets upstream of an error point. Subsequently, control returns to datastream entry 181. In the event the command is not immediate, then decision process 189 analyzes the command to see if it is an LCC command.

If the command is an LCC command then process 191 determines if the LCC command is syntactically correct and generates an exception 193 if it is not, and then returns to data entry 181. If the LCC command is syntactically correct, then process 195 resets a variable register named PARTITION with the number of partitions specified in the last received LCC command. Process 197 further analyzes the LCC command to see if mode is specified as duplex. If duplex is specified register variable PAGEMAX is set to twice the value of PARTITION in process 199. In addition, process 199 sets a variable register MODE equal to duplex and control returns to data entry 181. In the event duplex is not specified, process 201 sets PAGEMAX equal to the value of PARTITION and sets MODE equal to simplex. Subsequently control returns to data entry 181.

Alternately, if the command is not LCC, then process 203 determines if, nevertheless, a new sheet should be initialized. Since the last received LCC command may determine partition and mode values for any number of subsequent sheets, process 203 determines whether a new sheet should be initialized on the basis of a null value for a variable register named PAGE to be discussed shortly. In the event a new sheet is called for, process 205 initiates the creation of a new logical sheet in the sheet builder. Process 207 sets three variable registers before returning to datastream entry 181. Register DEFAULT_SIDE is set to front, register PAGE is set to the value for PAGEMAX established in process 199 or 201 by the last received LCC command, and register DEFAULT_PARTITION is set to the value of one. In the event a new sheet is not called for, then process control continues to splice 209 shown in FIG. 7A-B.

Figure 7B:
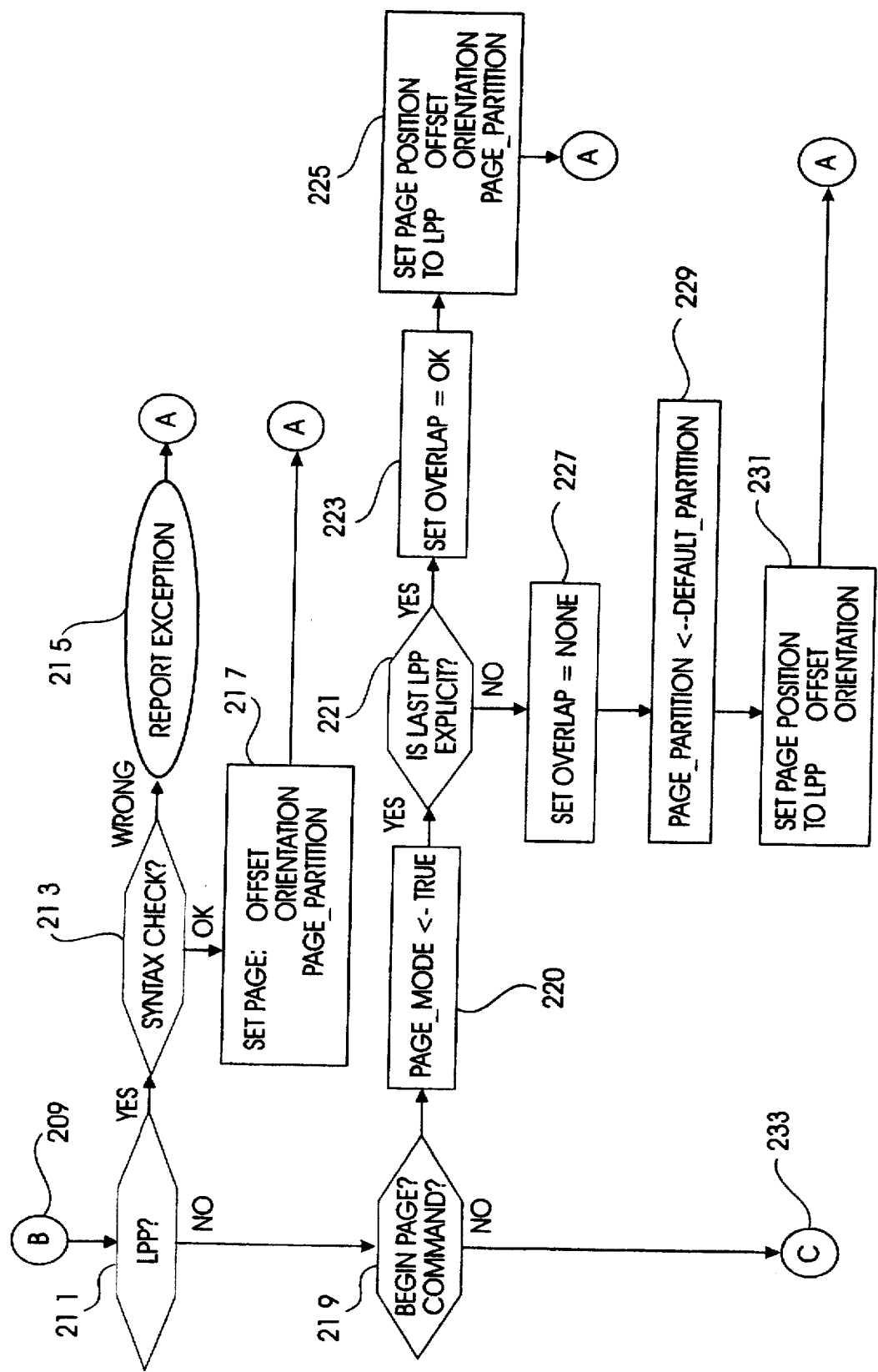

As shown in FIG. 7B, decision 211 determines if the command in the IPDS stream is an LPP command. If it is, then process 213 performs a syntax check on the LPP command. If syntax is incorrect, an exception is reported at step 215, and control returns to datastream entry 181. If the syntax is correct, process 217 sets the page positioning parameters to the offset, orientation and partition set by the LPP command and returns process control to data datastream entry 181.

If the command is not an LPP command then decision process 219 determines if it is a begin page (BP) command. If the command is a BP command, process 220 sets a register PAGE_MODE to a value of TRUE, and decision process 221 determines if the last LPP command called for explicit partition page placement. If the last LPP command did call for explicit page placement, then process 223 enables overlapping of page data beyond partitioning boundaries. Process 225 then sets page position to the offset, orientation, and partition determined by the last received LPP command. Control then returns to datastream entry 181. If the last LPP command called for default page placement, then process 227 disables overlapping so that page data beyond partition boundaries is prohibited. Then process 229 sets register PAGE_PARTITION equal to the value found in register DEFAULT_PARTITION. Next process 231 sets page position to the offset and orientation determined by the last LPP command and returns process control to datastream entry 181.

Figure 7C:
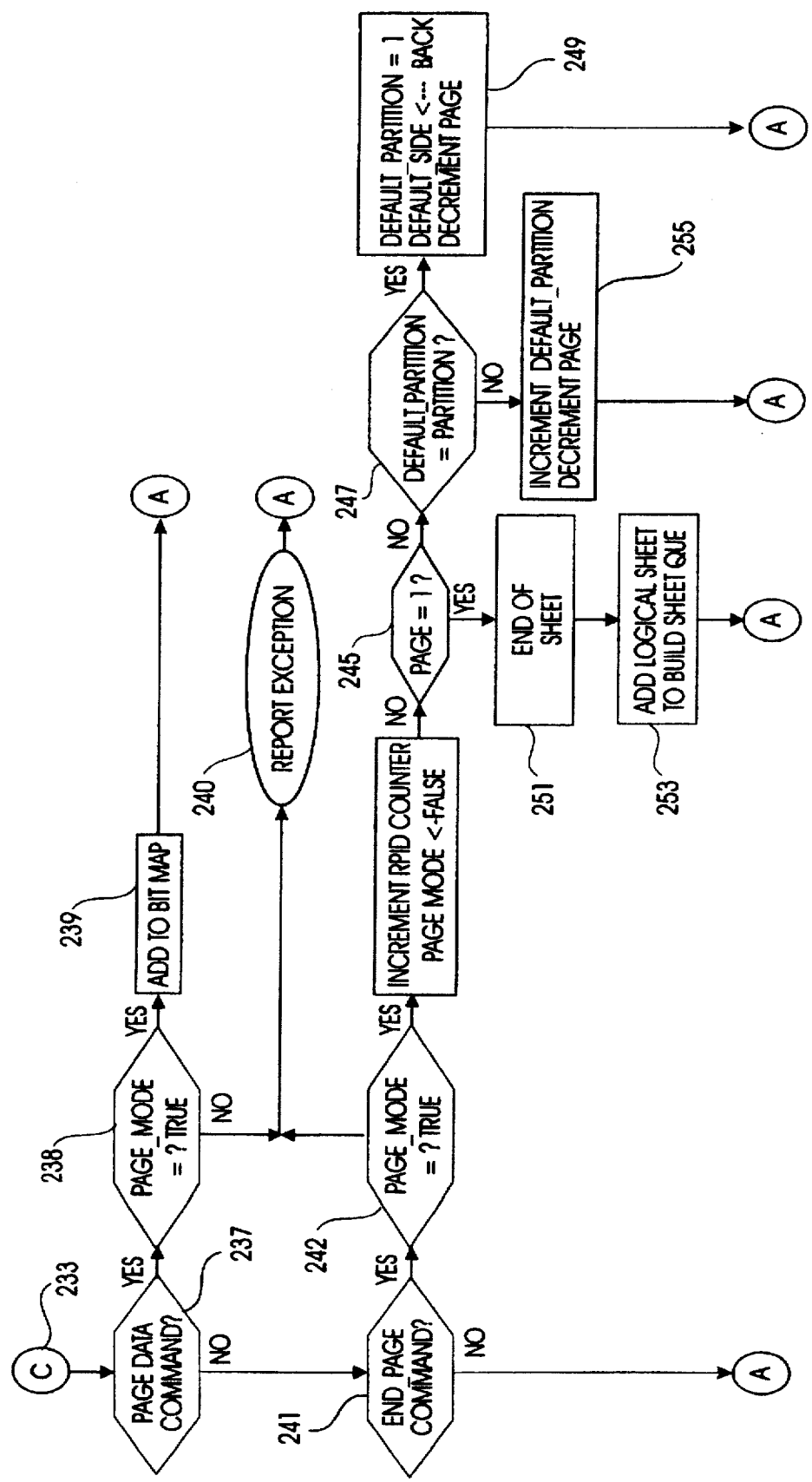

Alternately, if the command is not a begin page command, processing continues at page splice 233 shown on FIG. 7B-C.

Finally, FIG. 7C begins with decision 237 in which a page data command if detected. If page data is detected, then, in decision step 238, the register PAGE_MODE is checked to see if it is logical TRUE. If not then in process 240 an exception report is generated indicating that PAGE_MODE was not initialized by a Begin Page (BP) command, and control is returned to datastream entry process 181. Alternately, if PAGE_MODE is TRUE, then page data is added in process 239 to the bit mapped image of the logical page in the sheet build 15. If the command is not page data, then decision 241 determines if the command is an end of page command. If not, then process control returns to datastream entry 181. If an end of page command is detected, then in decision step 242, the register PAGE_MODE is checked to see if it is logical TRUE. If not, then in process 240 an exception report is generated indicating that PAGE_MODE was not initialized by a Begin Page (BP) command, and control is returned to datastream entry process 181. Alternately, if PAGE_MODE is TRUE, then in process 243, the received page identification counter is incremented, which indicates how many pages have been received by the build sheet 15, and the register PAGE_MODE is set to logical FALSE indicating the end of page data. Subsequently, decision process 245 determines if the value in a variable register PAGE is equal to one. If it is, then process 251 declares that all pages have been received by the sheet build that are to be placed on the logical sheet. Process 253 then adds the logical sheet in the sheet build 15 to the logical sheet queue 23 and returns process control to datastream entry 181.

Alternately if decision 245 detects that PAGE is greater than one and that the last page for this logical sheet has not yet been received, then control passes to decision 247 in which it is determined if the value of register DEFAULT_PARTITION is equal to the value for PARTITION specified by the last received LPP command. If the values are equal, then the value for DEFAULT_PARTITION is reset to 1 in process 249. In process 249 a variable register DEFAULT_SIDE used in default page placement is set to backside. Also in process 249, the variable register PAGE is decremented and control is returned to data entry 181. If, however, the DEFAULT_PARTITION is not equal to PARTITION then process 255 increments DEFAULT_PARTITION by one and decrements PAGE, and then returns process control to datastream entry 181. In the above mentioned manner, explicit or default page placement is provided to the sheet build 15 and, in turn, appears on the printed sheet 9 produced by the print engine 7.

The invention has been described in detail above by making reference to preferred embodiments thereof. However, it is known that those skilled in the art will, upon reading this detailed description, readily visualize yet other embodiments that are within the spirit and scope of this invention. Thus, it is intended that the above detailed description not be taken as a limitation on the spirit and scope of the invention.

What is claimed is:

1. A method for controlling page placement in predetermined logical partitions of sheets of paper, in a print system having a print spool or archive file of page images, a print system manager, a logical sheet builder, and printer, comprising the steps of:

arranging page data to be printed from a plurality of page images stored in said print spool or archive file in a primary datastream page description structure;

creating a plurality of media maps each specifying page placement as to partition and sheet side, in a primary datastream format description structure;

linking said page description structure and said format description structure;

transforming said first primary datastream page description and format description structures to a secondary datastream containing page and format description structures and wherein said secondary datastream further contains printer control structures;

tagging said secondary datastream format description structures with page placement specifiers as to partition and sheet side;

positioning said page description structures from said secondary datastream within the logical sheet builder in the partition and sheet side specified according to the format description structures of said secondary datastream; and printing on a sheet the sheet group formed in the logical sheet builder.

2. A method according to claim 1 wherein said step of creating a plurality of media maps each specifying page placement as to partition and sheet side, includes the substep of specifying page placement as to orientation, in said primary datastream format description structure;

said step of tagging said secondary datastream format description structures with page placement specifications as to partition and sheet side, includes the substep of specifying page placement as to orientation; and said step of positioning includes the substep of positioning said page description structures in the orientation specified according to the format description structures of said secondary datastream.

3. A method according to claim 1 wherein said step of creating a plurality of media maps each specifying page placement as to partition and sheet side, includes the substep of specifying page placement as to the offset of the page from an origin wherein said origin is selected from the group consisting of a sheet origin and at least one partition origin in said primary datastream format description structure;

said step of tagging said secondary datastream format description structures with page placement specifications as to partition and sheet side, includes the substep of specifying page placement as to offset; and said step of positioning includes the substep of positioning said page description structures in the offset specified according to the format description structures of said secondary datastream.

* * * * *